United States Patent [19]

Moore et al.

[11] 4,347,525
[45] * Aug. 31, 1982

[54] ELECTROSTATIC LABEL PRINTING SYSTEM

[75] Inventors: Robert A. Moore, Amherst; Bruce K. Norlund, Keene; Harold S. Kontrovitz, Keene; Clayton B. Robbins, Keene; Jeffrey B. Brooks, Keene, all of N.H.

[73] Assignee: Markem Corporation, Keene, N.H.

[*] Notice: The portion of the term of this patent subsequent to Jul. 28, 1998, has been disclaimed.

[21] Appl. No.: 190,804

[22] Filed: Sep. 25, 1980

Related U.S. Application Data

[62] Division of Ser. No. 87,153, Oct. 22, 1979, Pat. No. 4,281,334.

[51] Int. Cl.³ .................. G01D 15/06; G03G 15/22
[52] U.S. Cl. .................................. 346/153.1; 101/227; 101/DIG. 19
[58] Field of Search ............... 355/13, 14 R; 101/226, 101/227, DIG. 19; 156/384, 350, 367, 380; 118/40, 695; 346/153, 153.1; 83/74

[56] References Cited

U.S. PATENT DOCUMENTS

| | | | |
|---|---|---|---|
| 2,931,688 | 4/1960 | Innes et al. | 346/153 |
| 3,065,691 | 11/1962 | Sohn | 101/227 |
| 3,197,614 | 7/1965 | Engelstad et al. | 219/388 |
| 3,295,497 | 1/1967 | Albrecht et al. | 118/652 |
| 3,372,400 | 3/1968 | Epstein et al. | 346/153 |
| 3,674,352 | 7/1972 | Wilmes | 355/3 |
| 3,749,013 | 7/1973 | Ellner | 101/227 |
| 3,769,628 | 10/1973 | Kenny | 346/153 |
| 3,787,722 | 1/1974 | Hatsell | 361/225 |
| 3,846,150 | 11/1974 | Forgo et al. | 430/103 |
| 3,852,770 | 12/1974 | Jones et al. | 346/153 |
| 3,861,940 | 1/1975 | Forgo et al. | 355/17 X |
| 3,875,320 | 4/1975 | Forgo et al. | 101/DIG. 13 X |
| 3,886,563 | 5/1975 | Forgo et al. | 355/4 X |
| 3,908,191 | 9/1975 | Forgo et al. | 346/155 |
| 4,088,891 | 5/1978 | Smith et al. | 250/315 R |
| 4,281,335 | 7/1981 | Moore et al. | 346/153.1 |

FOREIGN PATENT DOCUMENTS 927636 5/1963 United Kingdom ............... 101/227

Primary Examiner—Evan K. Lawrence
Attorney, Agent, or Firm—Irons and Sears

[57] ABSTRACT

In the label printing system of the present invention, a strip of adhesive-backed label stock capable of receiving a latent charge image and having a releasable backing layer is drawn continuously from a supply reel and passed successively through an electrostatic print head, a developer, a pressure fixer, and a rotary die or butt cutter for separating the printed stock into individual labels on the uncut releasable backing layer. The latent imaging of each label at the electrostatic print head is carried out at defined discrete locations on the label stock. These locations may be defined in response to a synchronization signal produced by an angular position detector cooperating with the rotary cutter. The synchronization signal is indicative of a predetermined instantaneous rotational orientation of the cutting elements on the rotary cutting member, thereby insuring that the printed label indicia are properly centered within the label edges after die or butt cutting. When die cutting is used, separate takeup reels are provided for the waste cuttings and for the finished labels on the uncut releasable backing layer.

4 Claims, 8 Drawing Figures

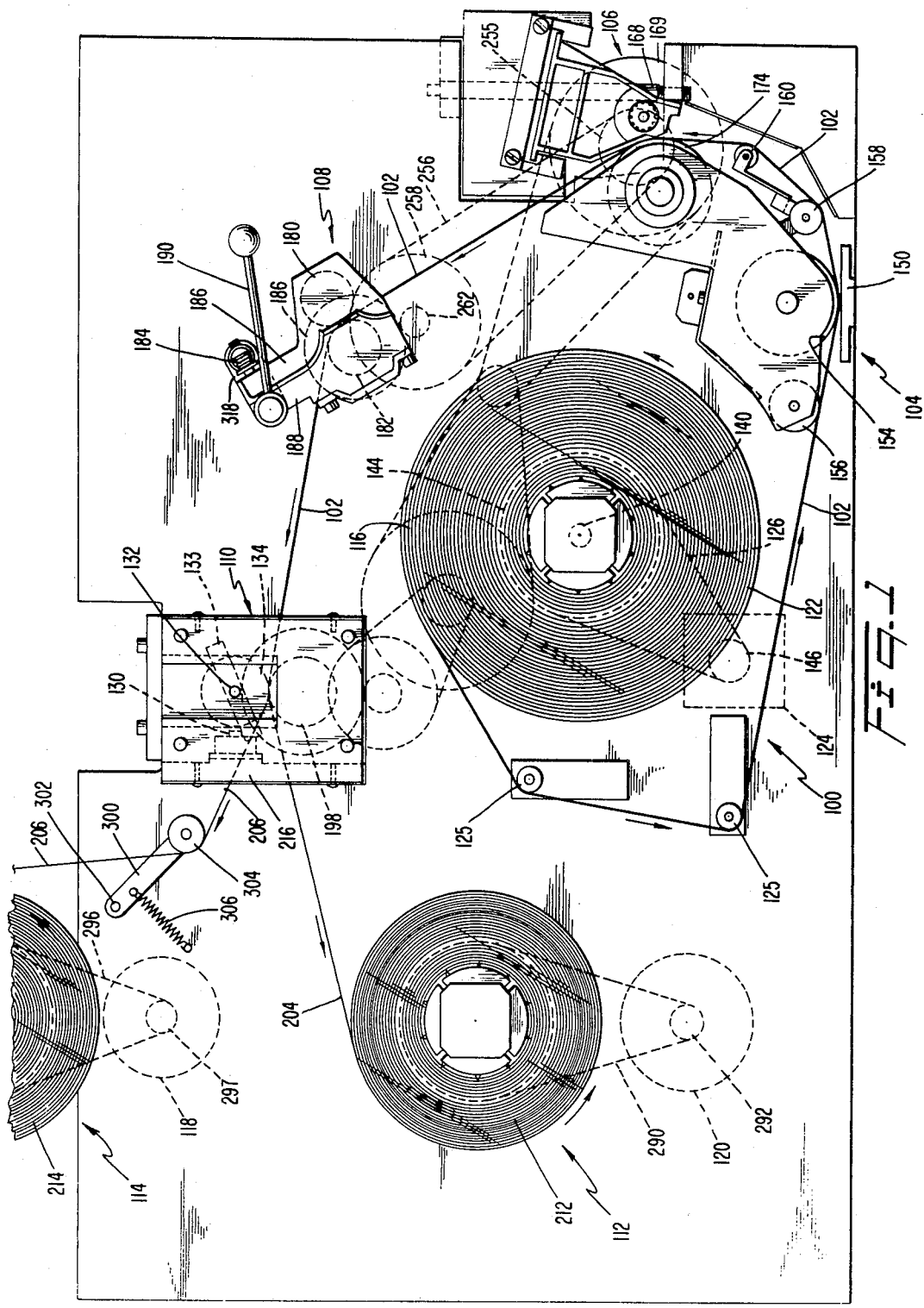

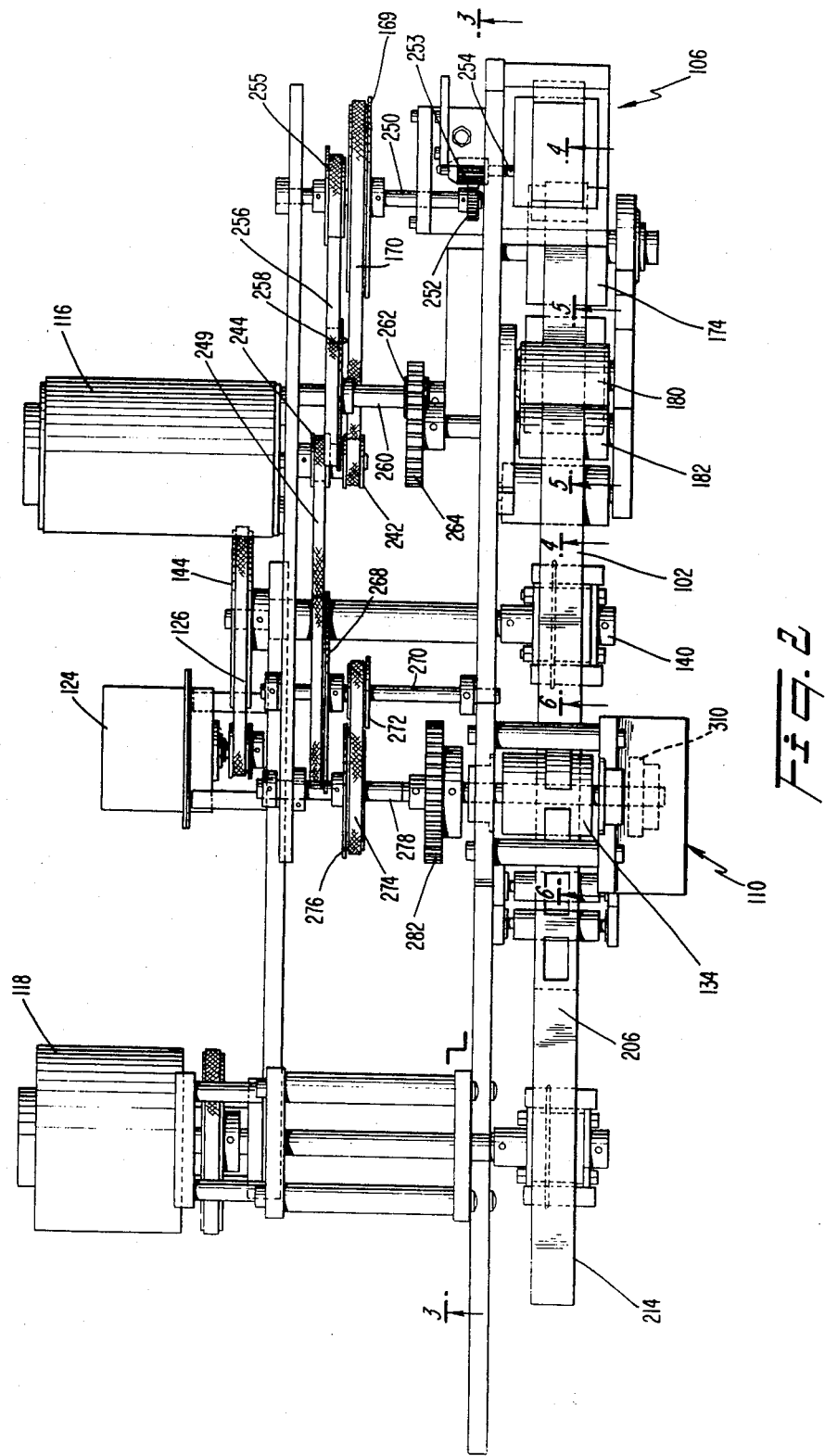

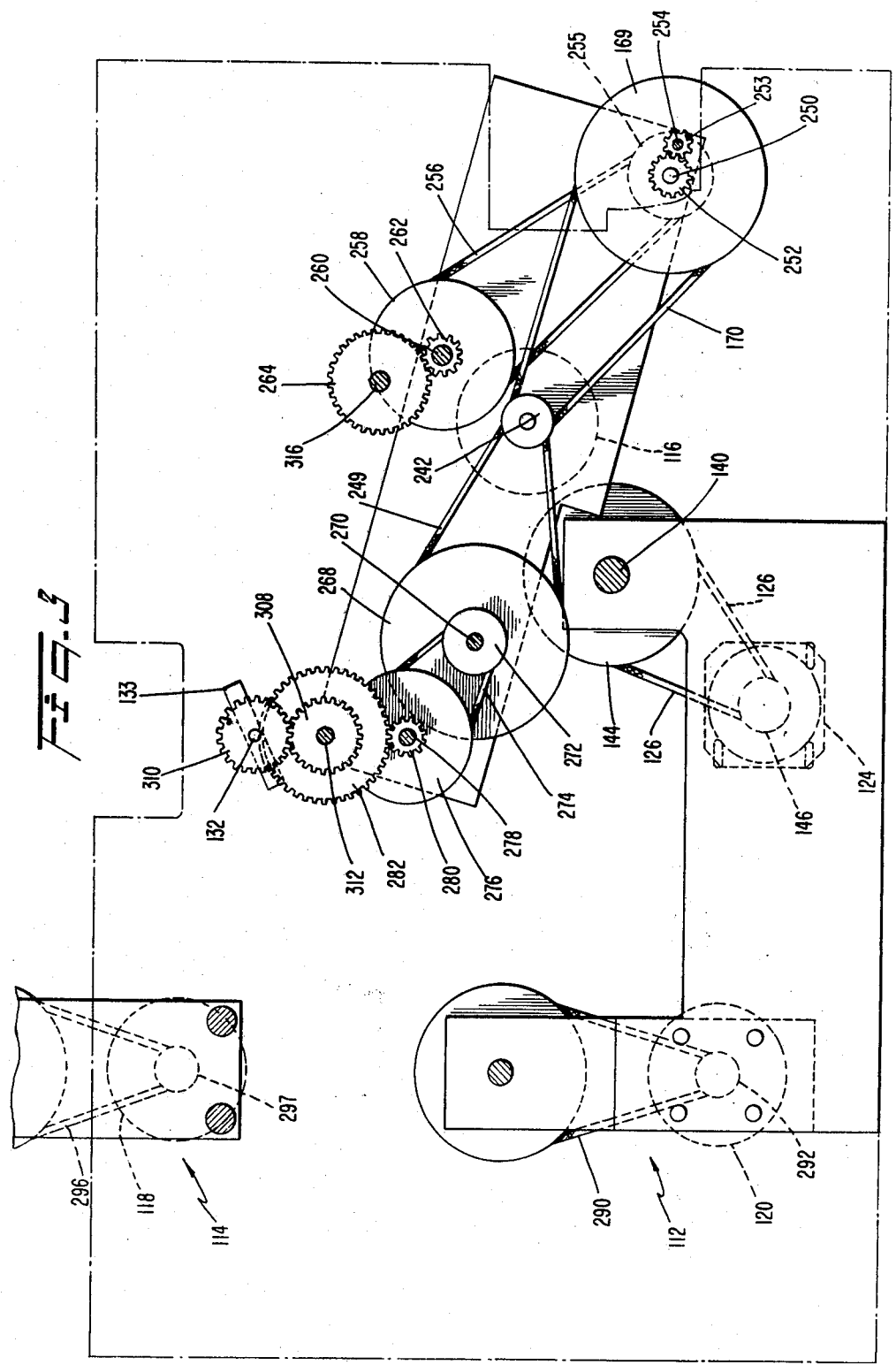

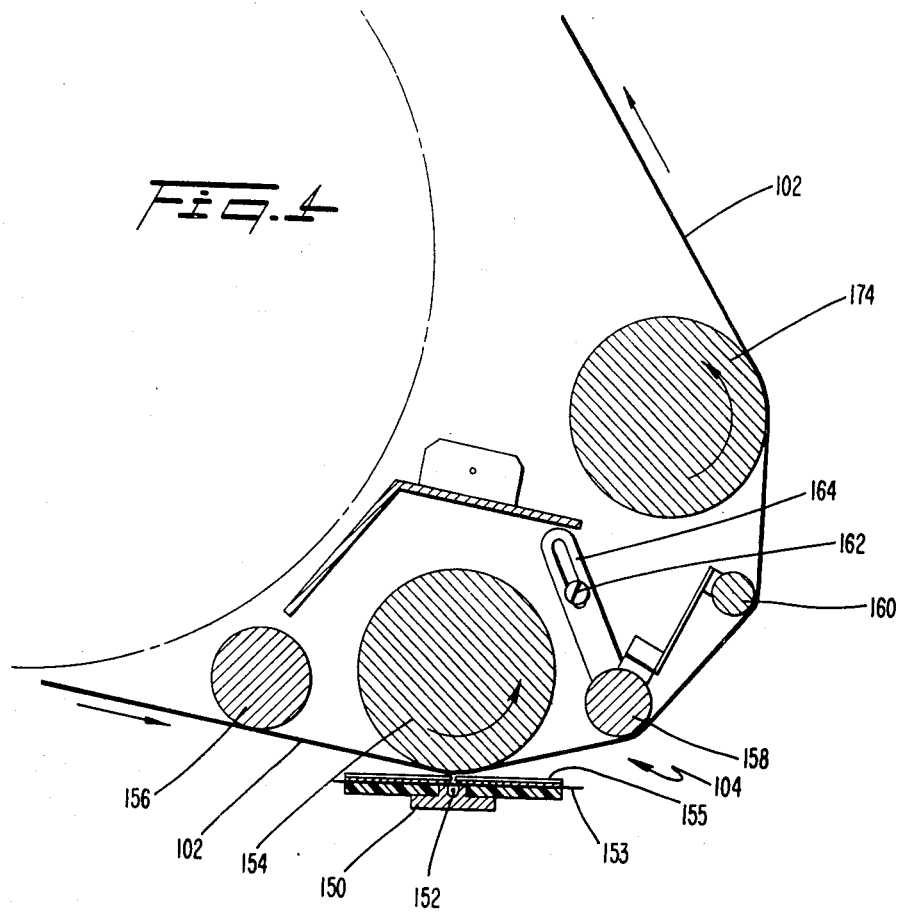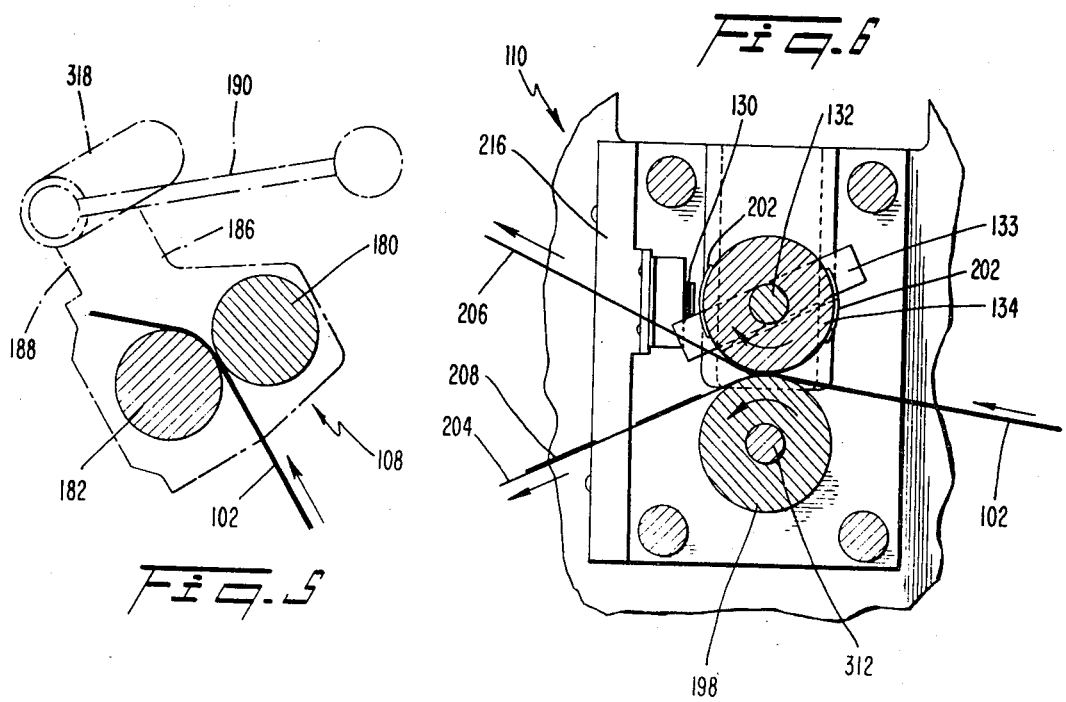

ELECTROSTATIC LABEL PRINTING SYSTEM

This is a division of application Ser. No. 087,153, filed Oct. 22, 1979, U.S. Pat. No. 4,281,334.

BACKGROUND OF THE INVENTION

1. Field of the Invention

The present invention relates generally to electrostatic printing systems. More particularly, the invention relates to a system for electrostatically printing successive labels at spaced locations along an uncut, continuously moving strip of label stock, and for then cutting the label stock between successively printed labels.

2. Description of the Prior Art

In U.S. Pat. No. 3,787,722, there is disclosed an electrographic label printing system intended for use with stripform label stock not initially provided with either an adhesive backing or a release layer. The bare label stock is passed sequentially through a charge application station, a toning and fixing station, an adhesive application station and a cutting and ejection station. Since the disclosed imaging system appears to require that the recording medium be maintained stationary during the charge application step, a clutch and brake assembly is provided to impart an intermittent motion to the strip. Following toning, fixing and adhesive application, the strip is divided into individual labels by a pair of opposed cutting bars which are apparently intended to be operated during the intervals when the strip is stopped.

A second known type of electrostatic label printing system is disclosed in U.S. Pat. No. 3,846,150. In this patent, self-adhering label blanks are supplied in pre-cut form on a continuous carrier foil strip (consisting, for example, of impregnated paper) which is wound onto a supply roll. The label-bearing carrier strip is conveyed intermittently through an electrostatic printing station, where latent charge images are deposited on the labels, and then over a sharp bend where the adherent labels are separated from the carrier strip. The individual labels are then retrieved by a rotating member which carries each label through corona discharge, developing and fixing stations, while the bare carrier strip is simultaneously conveyed by the strip feed mechanism to a collection receptacle for subsequent reuse. The intermittent motion of the strip feed mechanism is synchronized by a photoelectric sensing system interposed across the path of the strip for sensing the position of the individual labels adhering thereto. Similar label printing systems are described in U.S. Pat. Nos. 3,861,940, 3,875,320, 3,886,563, and 3,908,191.

None of the foregoing patents addresses the problem of properly synchronizing the label printing and cutting operations when the recording medium moves continuously (rather than intermittently) through the latent imaging, developing and fixing stations. It is apparent that when the printing and cutting operations are carried out at physically separated points along the path of the recording medium, inaccurate synchronization between these operations can result in off-center positioning of the label indicia within the borders of the final cut label, or worse, in a label which is unusable because a portion of its indicia has been cut off. In the case of a continuously moving recording medium, the cutting operation cannot be keyed to any programmed stopping of the medium in the manner apparently contemplated in the afore-mentioned U.S. Pat. No. 3,787,722. It is possible, of course, to avoid the cutting operation entirely by supplying the electrostatic printing system with pre-cut, self-adhering label blanks on a continuous carrier strip, as is done in the aforementioned U.S. Pat. Nos. 3,846,150, 3,861,940, 3,875,320, 3,886,563 and 3,908,191, but in that case a new supply of label blanks must be substituted each time that printed labels of a different size or shape are desired.

In prior art impression-type label printers, the problem of accurate coordination of the printing and cutting operations has been solved in various ways. In U.S. Pat. No. 3,065,691, for example, the printing type is entirely confined within a peripheral die cutter so that a properly centered label is immediately available for removal from a backing web after a combined printing and cutting operation. In U.S. Pat. No. 3,749,013, magnets are disposed along the periphery of a rotating printing drum to trip a reed switch when a complete label has been printed by the drum on a continuous label strip. Actuation of the reed switch in turn causes feeding of the label strip to cease and a knife cutter at the dispensing end of the printer to cut off a previously printed label at the appropriate point on the strip.

Neither of these approaches is applicable to electrostatic printing systems of the type contemplated in the present invention. Inasmuch as electrostatic print heads are generally designed for fairly precise dimensional tolerances with respect to the recording medium, and are often rather delicate in construction, it is impractical to combine the print head and the cutter member in one unit. Moreover, in contrast to the rotating or reciprocating mechanical apparatus used in impression printing, electrostatic print heads do not inherently require gross mechanical displacement to carry out imaging and are often made fixed and immovable. Consequently, in such systems it is not possible to synchronize the cutting operation with any repetitive physical motion of the print head.

SUMMARY OF THE INVENTION

In a preferred embodiment of the label printing sysem of the present invention, a strip of adhesive-backed dielectric label stock capable of receiving a latent charge image and having a releasable backing layer is drawnd continuously from a supply reel and passed successively through an electrostatic print head for carring out latent imaging of label indicia at discrete successive locations along the strip, a developer for applying toner to the imaged areas of the strip, a pressure fixer for rendering the developed images permanent, and a rotary die or butt cutter for separating the printed strip into individual labels around the discrete locations on the uncut release layer.

The drive systems employed for strip feeding and for the rotary cutter are interconnected. By appropriate choice of gearing ratios which are discussed hereinafter in conjunction with FIG. 3, the peripheral speed of the rotary cutter is made equal to the linear speed of the strip of label stock. Moreover, in accordance with an important feature of the invention, means are provided at the electrostatic write station to define the above discrete locations. For example, the latent imaging of each label at the electrostatic print head may be commenced in response to a synchronization signal produced by an angular position detector cooperating with the rotary cutter. The synchronization signal is indicative of a predetermined instantaneous rotational orientation of the cutting elements on the rotary cutter. In this manner, the spacing between successively printed label indicia along the moving strip of label stock is made eual to the spacing between adjacent cutting elements along the circumference of the rotary cutting member, thereby ensuring consistent centering of the printed label indicia within the label edges after the rotary die or butt cutting operation.

It will be observed that, by thus allowing the rotary cutter itself to effectively dictate the location and spacing of printed label indicia along the moving strip of label stock, properly centered labels are obtained without the necessity of stopping the motion of the strip for the purpose of alignment each time that a cutting operation is to be performed. It is therefore possible to move the strip continuously, rather than intermittently, during successive label printing and cutting operations. Moreover, by exploiting the motion of the rotary cutter to provide synchronization of the printing and cutting operations, the present invention dispenses with the need to key successive cutting operations to some periodic physical motion of the printing member, which usually does not occur when imaging is accomplished by means of an electrostatic print head. Further, proper synchronization of the printing and cutting operations will be realized by the present invention despite variations in the feed velocity of the moving strip of label stock, owing to the interconnected drive systems employed for strip feeding and rotary cutting.

In the preferred embodiment of an electrostatic label printing system in accordance with the present invention, the operations of latent imaging, developing, pressure fixing, label cutting, and rewinding onto a takeup reel are all carried out simultaneously at different stations along the same continuous strip of label stock. When butt cutting is used, the finished labels in the continuous releasable backing strip are simply rewound onto a single takeup reel. When die cutting is used, separate takeup reels are provided for the finished labels on the uncut releasable backing strip and for the strip of waste cuttings that results from the die cutting operation.

DESCRIPTION OF THE DRAWINGS

The various features of the invention will be more fully understood from the following detailed description when read in connection with the accompanying drawings, in which like parts are identified by common reference numerals. In the drawings:

FIG. 1 is an elevational view of an electrostatic label printing system in accordance with the present invention;

FIG. 2 is a plan view of the electrostatic label printing system of FIG. 1, showing the drive systems thereof;

FIG. 3 is an elevational view showing the interconnected drive systems for the developing, pressure fixing and rotary cutting stations, and the independent drive systems provided for the rewind and waste reels;

FIG. 4 is an elevational view of the electrostatic write station of the system of FIG. 1;

FIG. 5 is an elevational view of the pressure fixing station of the system of FIG. 1;

FIG. 6 is an elevational view of the rotary die cutting station of the system of FIG. 1, including the angular position detecting apparatus associated therewith;

DESCRIPTION OF THE PREFERRED EMBODIMENT

General Description

Figure 7:
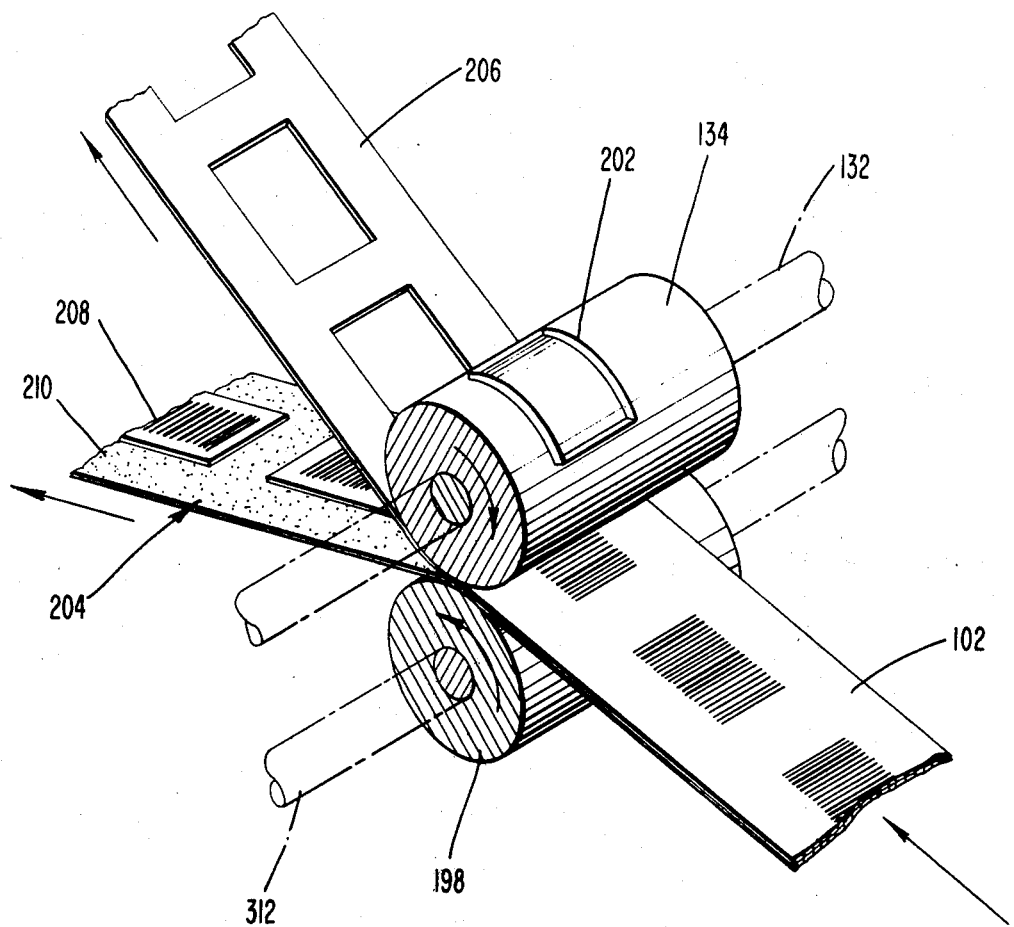
FIG. 7 is a perspective view of the rotary die cutting station of FIG. 6 showing the separation of the printed label stock into a finished label strip and a strip of waste cuttings.

Referring to FIG. 1, an electrostatic printing system in accordance with the present invention comprises generally a supply station 100 from which is drawn a strip of blank label stock 102 which may be a paper tape having a dielectric layer on one side and an adhesive layer and a releasable backing layer on the other, a write station 104 which forms any desired latent charge image on the strip, a developing station 106 which applies toner for developing the latent charge image formed on the strip by the write station 104, a pressure fixing station 108 which fixes the toner to the strip to render the developed image permanent, a cutting station 110 which cuts the printed strip into discrete segments for use as labels, a rewind station 112 which rewinds the printed labels onto a reel, and a waste station 114 which takes up the strip of waste cuttings produced by the die cutting operation. The strip 102 is drawn through the fixing station 108 by means of a drive motor 116 (shown in phantom) which also drives the developer station 106 and cutting station 110. The rewind station 112 is driven by its own motor 120. Similarly, the waste station 114 is driven by its own motor 118. A constant torque is imposed upon supply reel 122 of the supply station 100 by a magnetic brake 124 which is coupled to supply reel 122 by a belt 126.

The write station preferably comprises an electrostatic print head of the type disclosed in U.S. Pat. No. 3,689,933, which carries out latent imaging from an iron source by means of two staggered rows of electrically controlled apertures. As disclosed in copending U.S. application Ser. No. 087,152, entitled "Electrostatic Print Head", filed on Oct. 22, 1979 and assigned to the assignee of the present invention, a slotted focus plane may be interposed between the controlled apertures and the print medium to improve the resolution of the dot-matrix images produced by the print head. However, the invention may be used with any known type of write station 104 which is capable of carrying out latent or visible electrostatic imaging in response to a synchronization signal which may be produced by any conventional electrical or mechanical position detecting apparatus.

The printing of a latent image by the write station 104 and the cutting of the printed strip by the cutting station 110 are accurately coordinated by the generation of an electrical synchronization signal by a Hall effect position sensor 130 which senses the alignment therewith of an iron vane 133 adjustably fixed to the drive shaft of the upper roller 134 which forms the rotary cutting member of the cutting station 110. The rotary cutting member 134 includes one or more evenly spaced die cutting elements 202 (best seen in FIG. 7) along the circumference thereof, each of which cuts a predetermined area such as a rectangle around the printed indicia carried on the strip 102 in the known manner to define sections of the strip usable as labels. The synchronization signal is produced by the position sensor 130 each time alignment of the vane 133 indicates that one of the cutting elements on the rotary cutting member 134 has reached a predetermined rotational position. In response to the synchronization signal, latent imaging of the next successive label is commenced at the write station 104.

The drive systems for the rotary cutting station 110 and for the strip-feeding pressure fixer 108 are interconnected such that the rotational speed of the rotary cutting member 134 bears a fixed relationship to the linear speed of the strip 102. This relationship is such that the circumferential or tangential velocity of the cutting elements on the periphery of the rotary cutting member 134 is maintained equal to the linear feed velocity of the strip 102. By virtue of the synchronization signals produced by the angular position sensor 130, therefore, the spacing between successively imaged label areas on the strip 102 will be equal to the circumferential spacing between adjacent cutting elements on the periphery of the rotary cutting member 134 as imaged areas approach the cutting station 110. By appropriate angular adjustment of the vane 133 with respect to the shaft 132, consistent centering of the printed label indicia within the label edges will be realized as the strip 102 emerges from the rotary cutting station 110.

Supply Station

The supply station is illustrated in detail in FIG. 1. The supply 100 station includes a supply reel 122 of label stock which is supported by shaft 140. A pulley is mounted on shaft 140 for engaging a belt 126. Belt 126 is coupled to pulley 146 of magnetic brake 124. The magnetic brake 124 applies a drag to the label stock 102 as it is unwound from the supply reel to minimize discontinuities in the velocity of the label stock. In addition a flywheel (not shown) is affixed to shaft 140 of supply reel 122 to provide sufficient inertia to minimize velocity discontinuities in the strip of the label stock to compensate for lessening of inertia of the supply reel as the label stock is unrolled therefrom. As the strip of label stock 102 unwinds from the supply reel 122 it is rotatably supported on a plurality of idler wheel 125 which eliminates the side to side wobble of the strip that may otherwise result from an unevenly wound supply reel, thereby insuring proper alignment of the strip 102 at the write station 104.

Write Station

The write station 104 is illustrated in detail in FIGS. 1 and 4. The write station includes an electrostatic print head 150 which functions to form a latent image on the label stock 102. The construction of the print head 150 is not part of the present invention. Any conventional print head may be used, but a preferred type is the aperture-modulated ion beam print head described in the aforementioned U.S. Pat. No. 3,689,933. Such a print head is shown in FIG. 4. The print head 150 contains a source of ions 152 which are selectively modulated by two staggered rows of electrode-controlled apertures (not shown) in an aperture mask 153, to form a desired latent image on the continuously moving strip of label stock 102 supported on the backup roller 154. The source of ions 152, the modulated apertures in mask 153, and the backup roller 154 are biased in the conventional manner to form the desired latent image on the moving label stock 102.

As described in the aforementioned copending U.S. patent application Ser. No. 87,152, the print head 150 may have a slotted focus plane 155 interposed between the aperture mask 153 and the back plane 154. As developed more fully in said copending application, the interposition of such a slotted focusing plane, which may have a bias potential applied thereto, improves the resolution of the dot-matrix images produced by electrostatic print heads of the type described in U.S. Pat. No. 3,689,933. It is of particular utility in connection with the present invention when, for example, labels containing high-resolution bar codes for product identification purposes are being printed.

The label stock 102 is movably supported by idler wheels 156, 158 and 160. Idler wheel 156 is fixedly mounted within a frame not illustrated. The position of idler wheels 158 and 160 may be adjusted by loosening a mechanical fastener 162 and sliding the frame member 164 with respect to the fastener 162 in a direction transverse to the back surface of the label stock to adjust the tension on the label stock. The idler wheel 156 is grounded to remove any undesired electrostatic charge from the back surface of the label stock prior to forming of the latent ion image. The idler wheel 158 is grounded to provide a path along the back surface of the strip 102 for removing the charge buildup created on strip by the electronically biased backup roller 154 prior to the passage of the strip of label stock 102 into the developer station 106. The back side of the label stock is treated to have a sufficiently high conductivity for the aforementioned purposes.

Developer Station

The developer station 106 is illustrated in FIGS. 1 and 2. The developer station 106, which may use a single component toner such as is available from Hitachi Magnetics, functions to apply toner to the surface of the label stock 102 on which the latent image has been formed by the write station 104. The construction of such developer stations is well known and is not part of the present invention. A suitable unit is the Hitachi Model No. 5-1602 developer unit.

The developer station includes a rotating magnetic brush 168 which pick up agitated magnetic particles and brings them in close proximity to the latent image on the strip of label stock 102. As will be more clearly apprehended from FIG. 3, the toner brush is driven by a shaft 254 which is attached to a gear 253 that is in turn driven by a gear 252. Gear 252 is attached to shaft 250 which is driven by pulley 169. Pulley 169 is driven by belt 170 which is driven by a pulley 242 attached to motor 116. Referring again to FIG. 1, the label stock 102 is movably supported by idler wheel 174 during the application of toner particles to the label stock 102. The latent ion image on the paper tape attracts the toner particles to form an image of toner particles corresponding to the ion image.

Pressure Fixing Station

The pressure fixing station 108 is illustrated in FIGS. 1 and 5. The construction of the pressure fixing station 108 per se is not part of the present invention. A suitable unit is the Model No. 5-2109Z pressure fixer manufactured by Hitachi.

Pressure rollers 180 and 182 of the pressure fixing station 108 grippingly receive the imaged strip 102 therebetween in order to render permanent by pressure the toner that has been applied to the strip at developer station 106. Pressure rollers 180 and 182 also provide, by means of a drive system which will be described hereinafter, the primary feed drive for pulling the strip 102 through the write station 104 and developer station 106. An eccentric device, not shown, is operated by the arm 190. The eccentric device acts through yoke 318 and Belville washers 184 to urge pivoted frame member 186, which rotatably supports roller 180, toward fixed frame member 188, which rotatably supports roller 182, thereby controlling the pressure exerted on the strip 102.

The strip of label stock 102 is threaded between the pressure rollers 180 and 182 by the movement of arm 190 counterclockwise from the position illustrated in FIG. 1 to cause the eccentric device to spread the rollers 180 and 182 sufficiently to relieve their bias against each other. After threading is complete, the arm 190 is moved clockwise to the position illustrated in FIG. 1 to positively grasp the strip 102 between the rollers 180 and 182 to prepare the electrostatic printing system for operation.

Cutting Station

The rotary die cutting station 110 of the present invention divides the printed label stock into individual finished labels in the manner illustrated in FIGS. 6 and 7. By means of a belt and gear drive system which will be described in detail hereinafter in connection with FIG. 3, upper roller 134 and lower roller 198 are driven in synchronism in the directions indicated by the arrows in FIGS. 6 and 7. On the outer circumference of roller 134 are disposed one or more evenly spaced die or butt cutting elements 202 (shown as die cutting elements in FIG. 7) which make periodic penetrating contact with the adhesive-backed layer of the strip of label stock 102 in order to cut the printed label stock into individual labels as the roller 134 rotates. The confronting surface of roller 198 serves as a backup surface for the rotary cutting operation. Rollers 134 and 198 may be of equal diameter and are driven at the same rotational speed. In particular, the rotational speed of rollers 134 and 198 is such that the tangential velocity of a point on the circumference of either roller (specifically, the tangential velocity of the cutting elements 202 on the periphery of roller 134) is equal to the linear feed velocity of the strip of label stock 102, so that there is no relative slippage between the cutting elements 202 and the strip 102 during the time they are in contact.

Rollers 198 and 134 are almost, but not quite, tangent. Since the cutting station 110 is not required to impart feed motion to the strip of label stock 102, there is no gripping contact between the opposed surfaces of rollers 198 and 134 and the strip 102. Moreover, sufficient clearance is provided between the cutting elements 202 on the surface of the roller 134 and the opposing surface of the roller 198 to insure that the cutting elements 202 penetrate only the dielectric-coated paper layer of the label stock 102, and not the releasable backing strip which protects the adhesive side of the label stock. An adjustable eccentric device, not shown, may be provided to control the separation between the shafts 132 and 312 for this purpose, as well as to facilitate initial threading of the strip of label stock 102 between the rollers 134 and 198. Consequently, when cutting elements 202 of the die-cutting type are provided on the roller 134, as shown in FIG. 7, the rotary die cutting operation produces a first strip 204 consisting of individually cut labels 208 adhering to the uncut release strip 210, and a second strip 206 consisting of the waste cuttings from the cutting operation. As shown in FIG. 1, separate takeup reels 212 and 214 are provided for the finished label strip and for the waste strip, respectively.

In place of the die cutting elements 202 shown in FIG. 7, the upper roller 134 may instead be provided with butt cutting elements (not shown) which simply form straight-line cuts across the width of the label strip to define successive labels. In this case no waste strip is created and only the finished label takeup reel 212 of FIG. 1 is used, there being no need for the waste takeup reel 214.

In accordance with an important feature of the present invention, an angular position detector is provided which senses one or more predetermined instantaneous angular positions of the shaft 132 of the die-bearing upper roller 134. In the preferred embodiment, a Hall effect switch 130 is mounted on a frame member 216 adjacent roller 134 for alternately sensing the proximity of the two ends of the iron vane 133 which is fixed on the shaft 132 carrying the upper roller 134. The Hall switch 130 is preferably a model 1AV3A "Microvane" unit produced by Honeywell. For a two-ended vane 133 as shown in FIG. 6, two diametrically opposed die cutting elements 202 (or, alternatively, two diametrically opposed butt cutting edges, not shown) are spaced evenly around the circumference of the roller 134, so that one end of the vane 133 will align with the Hall device 130 each time that one or the other of the two die cutting elements attains a predetermined angular position about the axis of shaft 132. Each instance of such alignment causes the Hall device 130 to produce an electrical synchronization signal that is used to initiate latent imaging of the next successive label segment on the strip 102 at the electrostatic print head of the write station 104.

Since the linear feed velocity of the label strip 102 through the write station 104 is equal to the circumferential or tangential speed of the cutting elements on the periphery of die-bearing roller 134, it will be readily appreciated that the net effect of the above-described rotational position detecting system is to cause successive label indicia to be imaged on the strip 102 at a spacing equal to the center-to-center spacing between die cutting elements along the circumference of the roller 134. This satisfies what may be viewed as the spatial frequency requirement of the system. To obtain properly centered labels after the rotary die cutting operation, however, a phase condition must also be satisfied, that is, the leading edge of a given one of the die cutting elements 202 must begin to penetrate the strip 102 at the proper point relative to the label indicia printed thereon so that the printed area on the completed label is surrounded by a uniform border after the cutting operation. This condition is satisfied by appropriate angular adjustment of the vane 133 with respect to the shaft 132 and die-bearing roller 134. To enable this adjustment, vane 133 is releasably attached to shaft 132 by means of a set screw or the like (not shown).

In practice, the adjustment is made by allowing the system to carry out a number of successive printing and cutting cycles, observing the extent of cutting misalignment, and adjusting the vane 133 accordingly. This procedure is repeated until the labels are observed to be properly centered after emerging from the cutting station 110. The interaction of vane 133 and Hall device 130 with the write station 104 as previously described will then insure that all succeeding labels are properly centered.

It should be noted in connection with the adjustment procedure just described that it is not necessary for the vane 133 to be physically aligned with the opposed die cutting elements 202 on the surface of the roller 134. It is likewise not necessary that the alignment of one end of the vane 133 with the Hall device 130 occur as the leading edge of one of the die cutting elements begins to penetrate the strip of label stock 102. Proper operation of the present system is not dependent on either of these two types of physical alignment.

It is apparent that more than two die cutting elements could be spaced evenly along the circumference of the roller 134, or alternatively only one, as long as a corresponding number of radial vane sections are affixed to the shaft 132 for cooperation with the Hall device 130. It will also be appreciated that, although the foregoing description has assumed a uniform center-to-center spacing of successive die cutting elements 202 on the roller 134, the invention is equally applicable to nonuniformly spaced die cutting elements. In the latter case, it is merely necessary to provide on the shaft 132 an equal number of radial vane sections which are angularly displaced relative to one another in a manner corresponding to the relative angular spacing of die cutting elements on the roller 134. This insures that label indicia will be produced by the electrostatic print head on the strip of label stock 102 with a spacing which, while nonuniform, consistently anticipates the nonuniform spacing of die cutting elements along the circumference of the roller 134 when the strip 102 and roller 134 meet at the cutting station 110. It should be noted that in both the uniform and nonuniform cases, proper operation of the system does not require that the strip of label stock 102 traverse any particular distance between the write station 104 and the rotary cutting station 110, thereby permitting maximum flexibility in component layout.

As noted previously, the rotation of shaft 132 and hence of iron vane 133 is mechanically tied to the feed system for the strip of label stock 102. Accordingly, the above-described angular position sensing system automatically accounts for transient or permanent changes in the feed velocity of the strip 102 without the necessity for manual readjustment.

Electrical Interfacing

Figure 8:
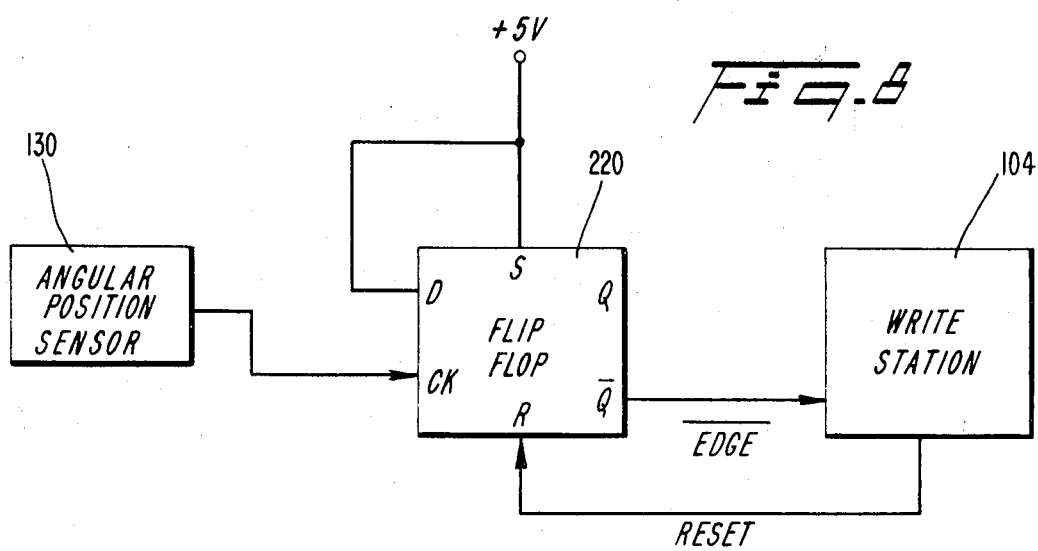
FIG. 8 is a schematic diagram of the electrical interfacing between the angular position detecting apparatus and the electrostatic write station.

FIG. 8 illustrates a schematic diagram of the electrical interfacing between the angular position detecting apparatus of FIG. 6 and the write station of FIGS. 1 and 4. As noted previously, the Hall effect angular position sensor 130 produces an electrical synchronization signal each time one end of the iron vane 133 aligns with the position sensor 130. The output of the position sensor 130 is applied to the clock input (CK) of a clocked flip-flop 220. The data input (D) of the flip-flop is tied to a power supply potential (e.g., +5 volts) for applying a constant high level signal thereto which produces a low level signal at the inverted output ($\bar{Q}$) of the flip-flop when a high level signal is applied to the clock input. The low level signal from the inverted output of the flip-flop (denoted $\overline{EDGE}$ to indicate its function in defining a label edge) is used to initiate the printing of information by the write station 104 as described previously. The initiation of printing by the write station is then used to reset the flip-flop by means of its reset (R) input to cause the $\bar{Q}$ output to go high, thereby preparing the system for a subsequent print cycle.

The interface couples the synchronization signal produced by the angular position sensor 130 to the cutting station 110 to properly time the cutting of portions of the label stock 102 which have been previously imaged by the write station 104, developed by developer station 106 and fixed by pressure fixing station 108. The actual mode by which the write station 104 carries out latent imaging on the strip of label stock 102 is independent of the operation of the interface as long as a write station is used which can initiate printing in response to a synchronization signal and then generate a signal which signals that imaging has in fact been initiated for resetting flip-flop 220 to prepare the system for receiving the next synchronization signal from the angular position sensor 130. The use of a flip-flop 220 in the manner described is not essential but may be advantageous when, for example, the write station 104 includes a computer for generating the label indicia to be printed by the electrostatic print head, since the flip-flop provides an unambiguous data level suitable as an input to the computer. Computer-controlled imaging per se, however, is known in the art and forms no part of the present invention.

Drive Systems and Rewind Stations

FIGS. 2 and 3 illustrate the drive systems for an electrostatic printing apparatus in accordance with the present invention. Three independent drive systems are used. The first independent drive system is an interconnected system for supplying power to developer station 106, pressure fixing station 108, and cutting station 110 of FIG. 1, and functions as the primary feed drive for the label stock. The second drive system supplies power for the label rewind station 112. The third drive system supplies power for the waste station 114.

The first drive system is powered by a synchronous motor 116 which has two pulleys 242 and 244 (seen in FIG. 2) which respectively apply rotary power directly to the developer station 106 and the cutting station 110 by means of belt drives 170 and 249. The developer station 106 has a pulley 169 which is driven by the belt 170. Pulley 169 is attached to shaft 250 which drives gear 252 which in turn drives a gear 253 attached to shaft 254 for supplying power to the drive mechanism of the magnetic brush of the developer station 106 of FIG. 1.

Power for the pressure fixing station 108 is transferred from the pulley 255, which is mounted on shaft 250 behind pulley 169, to pulley 258 of the pressure fixing station by a belt 256. The pulley 258 of the pressure fixing station is attached to shaft 260 on which is mounted gear 262. Gear 262 applies recovery power to a cooperating gear 264 which has a shaft on which is mounted driven pressure roller 182 of the pressure fixing station. Roller 180 of the pressure fixing station 108 is not driven but will rotate in synchronism with the driven roller 182 when the strip of label stock 102 is pinched between the two rollers when the system is in operation. As pointed out previously, pressure fixing station 108 provides the primary feed drive for the strip 102 and thus establishes the uniform feed velocity of the strip as it passes through the write station 104 and developing station 106. By the action of the rewind stations 112 and 114 in maintaining the strip 102 taut as it passes through the rotary cutting station 110, this uniform feed velocity of the strip is preserved through the remainder of the system.

The pulley 244 which is attached to the motor 116 drives a belt 249 which applies rotary motion to a pulley 268 associated with the cutting station 110 of FIG. 1.

The pulley 268 is attached to a shaft 270 to which is attached a pulley 272. Pulley 272 applies power to belt 274 which in turn drives a further pulley 276. Pulley 276 is mounted on a shaft 278 on which is also mounted a gear 280. Gear 280 meshes with a larger gear 282, which is mounted on the shaft 312 of the lower roller 198 of the rotary cutting station 110 (FIG. 6) in order to provide a source of rotary power therefor. Also mounted on shaft 312 is a gear 308 which meshes with a further gear 310 of the same size and number of teeth as the gear 308. Gear 310 is mounted on the shaft 132 of the upper die-bearing roller of the rotary cutting station 110 in order to provide rotary power thereto. Since gears 308 and 310 are identical, rollers 198 and 134 of the rotary cutting station are driven at the same rotational speed. The ratios of the belt and gear drive system connecting the rollers 198 and 134 to the motor 116 are chosen such that the circumferential or tangential velocity of these rollers is equal to the linear feed velocity imparted to the strip of label stock 102 by the pressure fixing station 108.

As will be apparent from an inspection of FIG. 3, the substantial rotational inertia of electric motor 116 is effectively interposed between the belt and gear drive to the rotary cutting station 110 and the belt and gear drive to the pressure fixing station 108. This tends to isolate mechanical transients created by the intermittent action of the rotary cutting members 202 on the roller 134 of the cutting station 110 from the primary drive of the strip 102 by rollers 180 and 182 of the pressure fixing station 108. Absent such isolation, velocity transients would tend to be introduced into the uniform motion of the label stock 102. While such transients would not significantly affect the operation of the angular position sensing system cooperating with the cutting station 110, they may have the effect of degrading the resolution of the imaging process at the electrostatic write station 104 and consequently should be minimized, particularly when printing high-resolution label indicia such as bar codes. The second drive system includes a motor 120 which drives the label rewind station 112. Motor 120 drives the takeup reel 212 (see in FIG. 1) onto which are wound the finished labels that have just passed through the rotary cutting station 110. The reel 212 is driven by a belt 290 which is powered by a pulley 292 that is attached to the shaft of motor 120.

The third drive system consists of a motor 118 for operating the waste rewind station 114. The shaft of motor 118 has a pulley 297 attached thereto which drives a belt 296. Belt 296 drives a pulley which provides rotary power for the waste takeup reel 214 (seen in FIG. 1). Since the strip of waste cuttings 206 that results from the rotary due cutting operation is rather fragile and easily broken, motor 118 may be a variable torque motor whose torque increases in proportion to the diameter of the waste takeup reel 214. This may be accomplished by supplying the motor 118 with power from a variable transformer or "variac", not shown, whose output voltage is controlled by a follower arm, also not shown, which is arranged to sense the diameter of either the finished label takeup reel 212.

Breakage of the strip of waste cuttings 206 is also made less likely by the addition of a dancer arm 300 (FIG. 1) in the path of the strip 206 between the rotary cutting station 110 and the waste takeup reel 214. Dancer arm 300 is pivoted at point 302 and has a roller 304 at the opposite end thereof for engaging the strip of waste cuttings 206. Spring 306 attenuates any abrupt changes in tension that may occur as a result of the variable stripping forces on the strip of waste cuttings 206.

Motors 120 and 118 of the rewind stations 112 and 114 need exert only enough torque to draw the strip 102 in a taut condition through the rotary cutting stations 110 and to rewind the finished label and waste strips 204 and 206 (FIG. 1) onto the respective takeup reels 212 and 214. The torque of these motors is not, however, sufficient to substantially affect the uniform feed velocity of the strip 102 that is established by the pressure rollers 180 and 182 of the pressure fixing station 108.

Operation

It is apparent that the electrostatic printing system described herein is capable of carrying out the operations of latent imaging, developing, fixing, rotary die cutting and rewinding on a continuous strip of adhesive-backed dielectric label stock having a releasable backing layer. By synchronizing the latent imaging operation at the electrostatic print head to the die cutting operation at the rotary cutting station, properly centered labels are obtained after cutting regardless of the feed rate of the label stock and without the necessity of periodically stopping the strip feed to permit cutting.

The present invention is not limited to a configuration where the angular position detector is associated with the rotary cutting station. The angular position detector may be associated with the driven wheel 182 of the pressure fixing station 108 or the idler wheel 180. The association of the angular position detector with the driven wheel 182 is preferred because the driven wheel is more immune to differential velocity changes such as slippage between it and the label stock than the idler wheel 180. Moreover, the angular position detector could be associated with any driven wheel or idler wheel associated with the label stock feeding system which has an angular velocity equal to the angular velocity of the roller 134 when the number of vanes 133 is equal to the number of die or butt cutting elements mounted on the roller. Alternatively, the angular velocity of the vanes 133 of the angular position detector may be an integer multiple of the angular velocity of the rotary cutting station where the number of vanes is integrally divisible into the number of die or butt cutting elements.

Moreover, when the angular position detector is associated with a driven or idler wheel which has a surface moving at the same tangential velocity as the linear velocity of the label stock and is not associated with the cutting station, the synchronization signal may be used to actuate non-rotary types of cutting elements which do not introduce substantial velocity changes which interfere with the smooth continuous motion of the label stock through the system.

While the present invention is not limited to a particular type of label stock, a suitable type of label stock is described in U.S. Pat. No. 3,907,557. For example, in order to obtain sufficient developed image density at seven inches per second, the label stock should have a capacitance of 250 pF per square inch resulting in a latent voltage of about 150 volts. Moreover, the back surface of the label stock may be treated with a salt solution to yield a resistivity of between about $10^7$ and $10^8$ ohms per square.

Although the present invention has been described with reference to a preferred embodiment, it will be apparent to those skilled in the art that many modifications may be made thereto without departing from the spirit and scope of the invention. It is not necessary, for example, that the angular position detecting apparatus cooperating with the rotary die cutter consist of a Hall device and a rotating iron vane as described. Many other electrical and mechanical systems such as a shaft encoder or a cam and microswitch arrangement, could be used to detect angular position. Moreover, an adjustable time delay device may be interposed in the electrical line connecting the Hall device to the write station to avoid the need for mechanically adjusting the angular orientation of the iron vane with respect to the die-bearing roller of the rotary cutting station in order to center the label indicia within the edges of the finished label. The developer station is not limited to a particular type of developer station and may be for example any conventional heat, pressure or solvent type station. All such substitutions and modifications are intended to be embraced within the scope of the appended claims.

What is claimed is:

1. An electrostatic label printing system for printing label indicia on a continuous strip of label stock comprising an adhesive-backed layer capable of receiving a latent charge image and a releasable backing layer on the adhesive surface thereof, said electrostatic label printing system comprising:
   (a) a supply reel for dispensing a continuous strip of said label stock,
   (b) an electrostatic write station for carrying out latent imaging at discrete locations on the adhesive-backed layer of said continuous strip of label stock to form successive latent images thereon,
   (c) a developing station for rendering visible the latent image produced on said continuous strip of label stock by the electrostatic write station,
   (d) a pressure fixing station for rendering permanent the visible images developed on said continuous strip of label stock by said developing station, said pressure fixing station comprising first and second pressure rollers for grippingly engaging said continuous strip of label stock therebetween,
   (e) a rotary die cutting station for die cutting only the adhesive-backed layer of said continuous strip of label stock around said discrete locations to form individual printed labels on the releasable backing layer, said rotary die cutting station including a rotating cutting member having at least one die cutting element thereon having a tangential velocity for making periodic penetrating contact with said adhesive-backed layer,
   (f) drive means for supplying rotary power to said rotary cutting member and to at least one of said first and second pressure rollers for drawing the continuous strip of label stock grippingly engaged therebetween through said electrostatic write station and said developing station at a uniform feed velocity equal to the tangential velocity of said cutting element,
   (g) label takeup means for drawing said continuous strip of label stock through said rotary cutting station at said uniform feed velocity and for rewinding said releasable backing layer with said individual printed labels thereon onto a label takeup reel,
   (h) waste takeup means for drawing said continuous strip of label stock through said rotary cutting station at said uniform feed velocity and for rewinding onto a waste takeup reel the strip of waste cuttings cut from the adhesive-backed layer by the die cutting operation, and
   (i) means for defining said discrete locations on the adhesive-backed layer of said continuous strip of label stock at said electrostatic write station.

2. An electrostatic label printing system as defined in claim 1, further comprising a spring-biased dancer arm for attenuating abrupt changes in tension on said strip of waste cuttings as it is rewound onto said waste takeup reel.

3. An electrostatic label printing system as defined in claim 1, wherein said drive means comprises:
   (a) a source of rotary power having rotational inertia,
   (b) a first mechanical coupling between said source of rotary power and said rotary cutting member for transmitting rotary power from said source of rotary power to said rotary cutting element, and
   (c) a second mechanical coupling between said source of rotary power and said one of said first and second pressure rollers for transmitting rotary power from said source of rotary power to one of said first and second pressure rollers, whereby mechanical transients produced by the operation of said rotary cutting member are substantially isolated from said one of said first and second pressure rollers by said rotational inertia.

4. An electrostatic label printing system as defined in claim 3, wherein said source of rotary power is an electric motor.

* * * * *